United States Patent
Morgan et al.

(10) Patent No.: US 11,186,522 B1
(45) Date of Patent: Nov. 30, 2021

(54) CARBON FOAM BASED SILICON CARBIDE

(71) Applicants: Dwayne R. Morgan, Wheeling, WV (US); Frederick H. Wade, Wellsburg, WV (US)

(72) Inventors: Dwayne R. Morgan, Wheeling, WV (US); Frederick H. Wade, Wellsburg, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 407 days.

(21) Appl. No.: 16/390,150

(22) Filed: Apr. 22, 2019

(51) Int. Cl.
  *C04B 38/06* (2006.01)
  *C04B 35/571* (2006.01)
  *C04B 35/52* (2006.01)

(52) U.S. Cl.
  CPC .......... *C04B 38/0615* (2013.01); *C04B 35/52* (2013.01); *C04B 35/571* (2013.01); *C04B 2235/3826* (2013.01); *C04B 2235/422* (2013.01)

(58) Field of Classification Search
  None
  See application file for complete search history.

(56) References Cited

U.S. PATENT DOCUMENTS

| | | | | |
|---|---|---|---|---|
| 5,053,148 A | * | 10/1991 | von Bonin | C04B 38/00 252/8.05 |
| 6,087,024 A | * | 7/2000 | Whinnery | B22F 3/1125 264/42 |
| 6,887,809 B1 | * | 5/2005 | Adler | C04B 38/045 501/88 |
| 2010/0239470 A1 | * | 9/2010 | Pham-Huu | C02F 1/32 422/186 |
| 2011/0135558 A1 | * | 6/2011 | Ma | C04B 35/5603 423/345 |
| 2019/0292441 A1 | * | 9/2019 | Hill | B29B 13/08 |

* cited by examiner

*Primary Examiner* — John J Figueroa
(74) *Attorney, Agent, or Firm* — Philip D. Lane

(57) ABSTRACT

Producing silicon carbide carbon foam is described. The process includes filling the pores of a carbon foam with a polysiloxane resin and heating the impregnated carbon foam to high temperatures to convert the silicon in the polysiloxane resin to silicon carbon within the carbon foam.

7 Claims, No Drawings

CARBON FOAM BASED SILICON CARBIDE

FIELD OF THE INVENTION

The present invention is directed to forming silicon carbide using carbon foam.

SUMMARY OF THE INVENTION

The present invention is directed to producing a silicon carbide carbon foam by impregnating carbon foam with a polysiloxane resin to form an impregnated carbon foam and heating the impregnated carbon foam to a temperature of at least about 1000 C for a time sufficient for at least a portion of the polysiloxane resin to react with carbon from the carbon foam.

Embodiments of the invention may include a method for producing silicon carbide carbon foam that includes dissolving a polysiloxane resin in a solvent, wherein the polysiloxane resin comprises repeating units having the formula $[-Si(R)_2-O-]_n$ wherein R may be one or more selected from the group consisting of, hydrogen methyl, ethyl, propyl, isopropyl, butyl, isobutyl, or t-butyl, and wherein n ranges from about 10 to about 100. The method includes impregnating carbon foam with the dissolved polysiloxane resin followed by removing a substantial portion of the solvent and repeating the step of impregnating and removing the solvent a predetermined number of times to form an impregnated carbon foam. The impregnated carbon foam may be heated to a temperature of at least about 1000 C for a time sufficient for at least a portion of the polysiloxane resin to react with carbon from the carbon foam to form silicon carbide carbon foam.

DETAILED DESCRIPTION OF EMBODIMENTS OF THE INVENTION

Some preferred embodiments of the present invention are described in this section in detail sufficient for one skilled in the art to practice the present invention without undue experimentation. It is to be understood, however, that the fact that a limited number of preferred embodiments are described in this section does not in any way limit the scope of the present invention as set forth in the claims.

It is to be understood that whenever a range of values is described herein, i.e. whether in this section or any other part of this patent document, that the range includes the end points and every point therebetween as if each and every such point had been expressly described. Unless otherwise stated, the words "about" and "substantially" as used herein are to be construed as meaning the normal measuring and/or fabrication limitations related to the value or condition which the word "about" or "substantially" modifies. Unless expressly stated otherwise, the term "embodiment" is used herein to mean an embodiment of the present invention.

The present invention is directed to producing a silicon carbide carbon foam from carbon foam. In general, the process involves impregnating carbon foam with a polysiloxane resin, heating the impregnated carbon foam to a temperature sufficient for the polysiloxane resin to react with the carbon foam to form silicon carbide.

The carbon foam starting material is not particularly limited and may include carbon foams made from coal, pitch, or polymer starting materials. The carbon foams preferably have sufficient porosity such that the polysiloxane resin may infiltrate the pores of the carbon foam to a sufficient or desired amount. There is a relationship between the viscosity of the polysiloxane resin and the size of the pores in the carbon foam.

Carbon foam is typically a strong, open cell, durable, stable, easily machined, and relatively unreactive lightweight material. Carbon foams are carbonaceous materials of very high carbon content that have appreciable void volume. As such, carbon foams are primarily comprised of (elemental) carbon. In appearance, excepting color, carbon foams resemble readily available commercial plastic foams. The void volume of carbon foams is located within numerous empty cells. The boundaries of these cells are defined by the carbon structure. These cells typically approximate ovoids of regular, but not necessarily uniform, size, shape, distribution, and orientation. The void volumes in these cells may directly connect to neighboring void volumes. Such an arrangement is referred to as an open-cell foam. The carbon in these foams forms a structure that is continuous in three dimensions across the material. Typically, the cells in carbon foams are of a size that is readily visible to the unaided human eye. Also, the void volume of carbon foams is such that it typically occupies much greater than one-half of the carbon foam volume. The density of carbon foams typically is less than about 1 g/cc and generally less than about 0.8 g/cc. In some embodiments, the density for carbon foam may range from about 0.05 g/cc to about 0.8 g/cc. In some embodiments, carbon foams may exhibit compressive strengths ranging up to about 10,000 psi. In other embodiments, the compressive strength for carbon foam may range from about 100 psi to about 10,000 psi. In certain other embodiments, compressive strengths for carbon foam may range from about 400 psi to about 7,000 psi. The carbon foam may be carbonized carbon foam. Alternatively, if desired, the carbon foam may be graphitized carbon foam.

Carbon foams have been produced by a variety of methods. Some of these methods include producing carbon foams directly from particulate coal. For example, U.S. Pat. Nos. 6,749,652 and 6,814,765, each herein incorporated by reference in their entirety, describe methods for producing carbon foam directly from particulate coal. To produce carbon foam from particulate coal, typically, a suitable swelling coal, such as bituminous coal, is heated in an essentially closed vessel. The particulate coal is placed in a mold and is heated in an inert atmosphere under process atmospheric pressures typically greater than ambient and can reach pressures of about 500 psi or greater. The particulate coal is heated to temperatures sufficient to cause the coal to become plastic and swell, forming a carbon foam. In many instances heating the particulate coal to a temperature between about 300° C. and about 500° C. is sufficient to form a carbon foam material. The temperatures and pressure conditions will vary depending upon the characteristics of the particulate coal. The resultant carbon foam may subsequently be heated under an essentially inert, or otherwise non-reactive, atmosphere, to temperatures as great as about 3000° C. Heating of the carbon foam to such elevated temperatures has been found to improve certain properties of the foam. Such properties have included, but are not limited to, electrical resistance and strength. The production of carbon foam from mesophase pitch follows a similar process.

To produce silicon carbide carbon foam from carbon foam, a polysiloxane silicon-based compositions is used to infiltrate the porosity of the carbon foam. As used herein "polysiloxane" is a chemical compound having branched or unbranched backbones consisting of repeating siloxane units $[-Si(R)_2-O-]_n$ with side chains R attached to the silicon atoms, where R may be hydrogen or a C1 to about C4 hydrocarbon group, including but not limited to a methyl, ethyl, propyl, isopropyl, butyl, isobutyl, or t-butly group. Preferably, the polysiloxane ranges from about 10 to about 100 repeating siloxane units. In preferred embodiments, at least 50% of the repeating siloxane units are dimethyl siloxane units. In other embodiments dimethyl siloxane may range from about 20% to 100% of the siloxane repeating units.

The polysiloxane is preferably soluble in solvent to aid in infiltrating the pores of the carbon foam with polysiloxane. Preferable the polysiloxane is soluble in alcohols such as iso-propyl alcohol or denatured alcohol, acetone, aromatics, esters, ketones and selected paraffins and chlorinated hydrocarbons.

Prior to infiltration into the pores of the carbon foam, the polysiloxane is dissolved in the selected solvent. While it is desirable to dissolve the maximum amount of polysiloxane in the selected solvent, this has to be balanced with the resultant viscosity of the dissolved polysiloxane. If the infiltrating solution is too viscous, pores of the carbon foam may not be infiltrated fully.

Once the carbon foam is infiltrated with the polysiloxane resin, the infiltrated carbon foam may be heated to drive off any solvents used with the polysiloxane resin. The infiltrated carbon foam may then be reinfiltrated one or more times, or by a predetermined number of time by repeating the infiltrating and drying process to increase the loading or amount of polysiloxane resin within the carbon foam pores.

Once the carbon foam has been infiltrated with the polysiloxane resin with the desired amount of polysiloxane resin, the infiltrated carbon foam is heated to a temperature sufficient for the polysiloxane resin to react with carbon in the carbon foam to form silicon carbide. This heating step is preferably performed in an inert atmosphere such as helium or argon. In some embodiments, the polysiloxane impregnated carbon foam is heated to a temperature from about 1000 C to about 2000 C depending on the desired properties or form of the SiC. In some embodiments the heating step takes place at about 5 C/min to reach the final temperature followed by holding at the desired temperature for about 1 to about 4 hours or longer followed by slowly cooling the impregnated carbon foam to room temperature. In some embodiments the final temperature is held for at least 1 hour.

By heating the impregnated carbon foam to a temperature of about 1000 C to about 2000 C, a certain amount of the polysiloxane resin will react with the carbon in the carbon foam to form silicon carbide. In some embodiments, the resultant silicon carbide carbon foam will have a yield of silicon carbide of from about 50% to about 90% silicon carbide based on the amount of silicon from the polysiloxane resin. In other embodiments, the silicon carbide yield may range from about 80% to about 90% and still further from about 80% to about 85%.

While several embodiments of the present invention have been shown and described, it will be obvious to those skilled in the art that many changes and modifications may be made thereunto without departing from the spirit and scope of the invention as described in the claims. All United States patents and patent applications, all foreign patents and patent applications, and all other documents identified herein are incorporated herein by reference as if set forth in full herein to the full extent permitted under the law.

What is claimed is:

1. A method for producing a silicon carbide carbon foam comprising the steps of:
    impregnating carbon foam with a polysiloxane resin to form an impregnated carbon foam; and
    heating the impregnated carbon foam to a temperature of at least about 1000 C for a time sufficient for at least a portion of the polysiloxane resin to react with carbon from the carbon foam to form silicon carbide carbon foam.

2. The method of claim 1, wherein the time is at least about 1 hour.

3. The method of claim 2, wherein the time ranges from about 1 hour to about 4 hours.

4. The method of claim 1, wherein the polysiloxane resin comprises repeating units having the formula $[-Si(R)_2-O-]_n$ wherein R may be one or more selected from the group consisting of, hydrogen methyl, ethyl, propyl, isopropyl, butyl, isobutyl, or t-butyl, and wherein n ranges from about 10 to about 100.

5. The method of claim 2, wherein R on the repeating unit is methyl for at least 50% of the repeating units of the polysiloxane resin.

6. The method of claim 1, wherein the silicon carbide carbon foam exhibits a yield of silicon carbide from about 50% to about 90% silicon carbide based on the amount of silicon from the polysiloxane resin.

7. A method for producing silicon carbide carbon foam comprising the steps of:
    dissolving a polysiloxane resin in a solvent, wherein the polysiloxane resin comprises repeating units having the formula $[-Si(R)_2-O-]_n$ wherein R may be one or more selected from the group consisting of, hydrogen methyl, ethyl, propyl, isopropyl, butyl, isobutyl, or t-butyl, and wherein n ranges from about 10 to about 100;
    impregnating carbon foam with the dissolved polysiloxane resin followed by removing a substantial portion of the solvent;
    repeating the step of impregnating and removing the solvent a predetermined number of times to form an impregnated carbon foam; and
    heating the impregnated carbon foam to a temperature of at least about 1000 C for a time sufficient for at least a portion of the polysiloxane resin to react with carbon from the carbon foam to form silicon carbide carbon foam.

* * * * *